United States Patent [19]

Crossman

[11] Patent Number: 4,596,316
[45] Date of Patent: Jun. 24, 1986

[54] ELECTRICALLY ACTUATED AIRCRAFT BRAKES

[75] Inventor: Richard L. Crossman, Tallmadge, Ohio

[73] Assignee: Goodyear Aerospace Corporation, Akron, Ohio

[21] Appl. No.: 749,968

[22] Filed: Jul. 1, 1985

Related U.S. Application Data

[60] Continuation-in-part of Ser. No. 579,065, Feb. 10, 1984, Pat. No. 4,542,809, which is a continuation-in-part of Ser. No. 347,851, Feb. 11, 1982, Pat. No. 4,432,440, which is a division of Ser. No. 62,199, Jul. 30, 1979, Pat. No. 4,381,049.

[51] Int. Cl.$^4$ ............................................. F16D 55/02
[52] U.S. Cl. .................... 188/72.1; 188/72.8; 188/158; 192/84 R
[58] Field of Search ............... 188/72.8, 72.7, 72.1, 188/71.5, 71.1, 105, 158–165; 60/538; 303/20; 192/94, 84, 70.22; 74/424.8 R, 25

[56] References Cited

U.S. PATENT DOCUMENTS 3,235,045 2/1966 Pop .................................. 188/162 X
4,381,049 4/1983 Crossman ........................... 188/72.7
4,432,440 2/1984 Crossman ......................... 188/72.8 X Primary Examiner—Douglas C. Butler
Attorney, Agent, or Firm—P. E. Milliken; L. A. Germain

[57] ABSTRACT

A reciprocating drive for operative axial communication with a brake disk stack through a pressure plate to compress the disk stack for braking of a rotatable wheel comprises: a relatively stationary annular housing; an annular ram member mounted coaxially within the housing and adapted for axial movement and contacting engagement with the pressure plate to effect compression of the brake disk stack; a relatively rotatable annular ring gear member mounted coaxially between the housing and the ram member; a plurality of rollers operative between the rotatable ring gear and ram members to effect an axial movement of the ram member when interacting with the rotatable ring gear member; and at least two high torque motors mounted within the housing and having pinion drives for operative engagement with the ring gear member to rotate the member in response to an electrical signal. The rollers may comprise a planetary drive or a recirculating roller drive with suitably configured ring gear and ram member engagement surfaces.

15 Claims, 5 Drawing Figures

FIG.—4

ELECTRICALLY ACTUATED AIRCRAFT BRAKES

This is a continuation-in-part of prior application Ser. No. 579,065 filed Feb. 10, 1984 which is now issued to U.S. Pat. No. 4,542,809 on Sept. 24, 1985 which is a continuation-in-part of application Ser. No. 347,851 filed Feb. 11, 1982 now issued to U.S. Pat. No. 4,432,440 on Feb. 21, 1984 which is a division of application Ser. No. 062,199 filed July 30, 1979 now issued to U.S. Pat. No. 4,381,049 on Apr. 26, 1983.

BACKGROUND OF THE INVENTION

The invention described and claimed herein relates to aircraft brake assemblies wherein actuation of the brake is achieved by electrical control as opposed to actuation by hydraulic control. Hydraulically actuated aircraft braking systems are, of course, well known and understood in the prior art.

More particularly, the invention provides a brake assembly wherein a plurality of electric torque motors effect wheel braking through a reciprocating control means which operates to compress a multi-disk stack of frictional braking elements. In the applicant's prior applications and patents referenced above, the reciprocating control means is in various forms of a ball-screw drive mechanism. Electric torque motors, responding to an electrical signal from the pilot cockpit control, effect rotation of a ring gear member which interacts through a plurality of balls to drive an axially and linear moving ram member into contacting engagement with a brake pressure plate associated with a brake disk stack for braking action.

The embodiments described in this application are directed to a reciprocating control means in the form of roller screw drive mechanisms which also effect compression of the brake disk stack for braking action.

The embodiments described and claimed herein are directed to the reciprocating control means only and do not elaborate upon the means by which the pilot or user may apply the electrical control signals to the torque motors which drive the reciprocating control means. Any type of electric brake controller which regulates the direction of current flow to the torque motors to achieve either brake application or brake release may be applied to this invention.

SUMMARY OF THE INVENTION

A reciprocating drive for operative axial communication with a brake disk stack through a pressure plate to compress the brake disk stack for braking of a rotatable wheel comprises: a relatively stationary annular housing, an annular ram member mounted coaxially within the housing and adapted for axial movement and contacting engagement with the pressure plate to effect compression of the brake disk stack, a relatively rotatable annular shaped ring gear member mounted coaxially between the housing and the ram member, a plurality of rollers operative between the rotatable ring gear and ram members to effect an axial movement of the ram member when interacting with the rotatable ring gear member, and at least two high torque motors mounted within the housing and having drive means for operative engagement with the ring gear member to effect rotation of the member in response to an electrical signal. The rollers may comprise a planetary type drive or alternatively a recirculating roller type drive with suitably configured ring gear and ram members for each type of drive.

BRIEF DESCRIPTION OF THE DRAWINGS

For a complete understanding of the invention, reference should be made to the following detailed description and the accompanying drawings wherein.

DETAILED DESCRIPTION OF THE INVENTION

Figure 1:
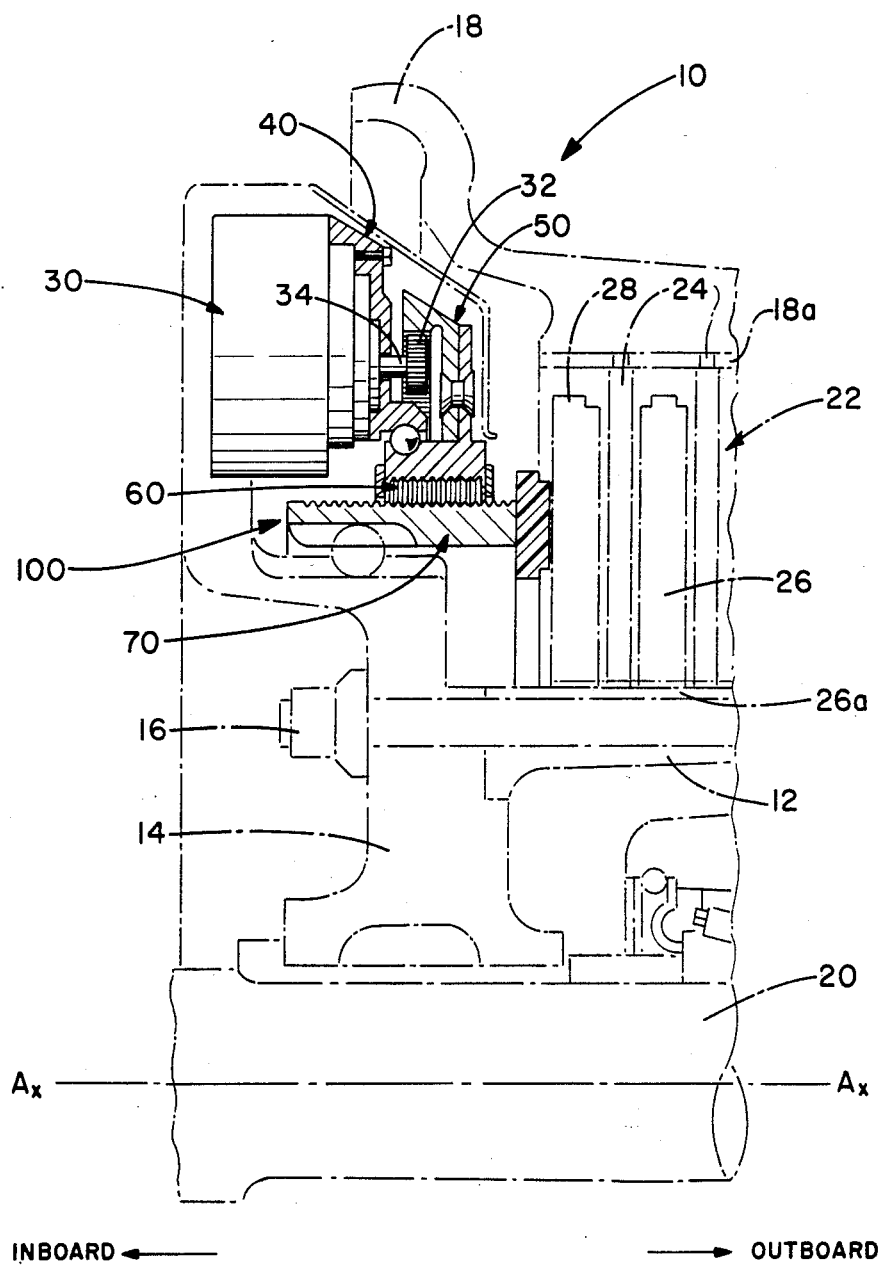
FIG. 1 is an elevational view, in partial cross-section through the upper half of a complete wheel and brake assembly which is operative about an axis of rotation indicated at $A_x$ and showing the reciprocating control means of this invention in solid lines as it may be associated with an electric torque motor drive, there being but a single motor illustrated and the various other elements comprising the wheel and brake assembly being shown via ghost dot-and-dashed lines.

Referring to FIG. 1 of the drawings, a wheel and brake assembly is generally indicated by reference numeral 10, the conventional elements thereof being shown by dot-dashed ghost lines and a specific configuration for a reciprocating control means according to this invention being indicated generally by reference numeral 100 and illustrated in solid lines.

The conventional elements of a wheel and brake assembly 10 include a torque tube 12 fixedly secured to a brake housing 14 by a plurality of bolts 16 and a wheel rim 18 rotatably mounted with respect to a wheel axle 20 and adapted for mounting of a tire (not shown). The axis of rotation of the rotating elements of the wheel and brake assembly is indicated by line $A_x$. The wheel rim 18 includes a plurality of drive keys 18a located about an inner peripheral surface which engage a plurality of rotatable friction disks 24, the disks 24 being alternate ones of a brake disk stack generally indicated by reference numeral 22. The friction disks 24 are, of course, rotatable with the wheel 18 while other alternate ones of the brake disk stack 22 are relatively stationary disks 26 which are keyed about an inner peripheral surface 26a to the torque tube 12. The disks 24,26 are therefore functional to provide braking of the wheel 18 when compressed in the axial direction by a forceful engagement imparted by a brake pressure plate 28 positioned at the inboard end of the brake disk stack 22.

The pressure plate 28 is also positioned for operative engagement with the reciprocating control means 100, which control means is part and parcel of a brake actuator which functionally effects compression of the brake disk stack for braking of the wheel 18. The reciprocating control means 100 generally comprises at least one torque motor 30 mounted in a relatively stationary housing member 40 and operatively positioned with respect to a rotatable ring gear member 50 to drive said member 50 into rotation about the $A_x$ axis by way of a pinion gear 32 mounted at the outboard extent of its drive shaft 34. The rotatable ring gear member 50 drives a movable ram member 70 into and out of axial engagement with the brake pressure plate 28 through a plurality of roller means 60 operatively positioned and mounted between the ring gear member 50 and the ram member 70. The roller means 60, according to the first embodiment of this invention, comprises a plurality of planetary type rollers having annular ridges and grooves which engage matching ridges and grooves in a peripheral bore surface of the rotatable ring gear member 50 while also engaging helical ridges and grooves in the outwardly facing surface of the ram member 70.

Figure 2:
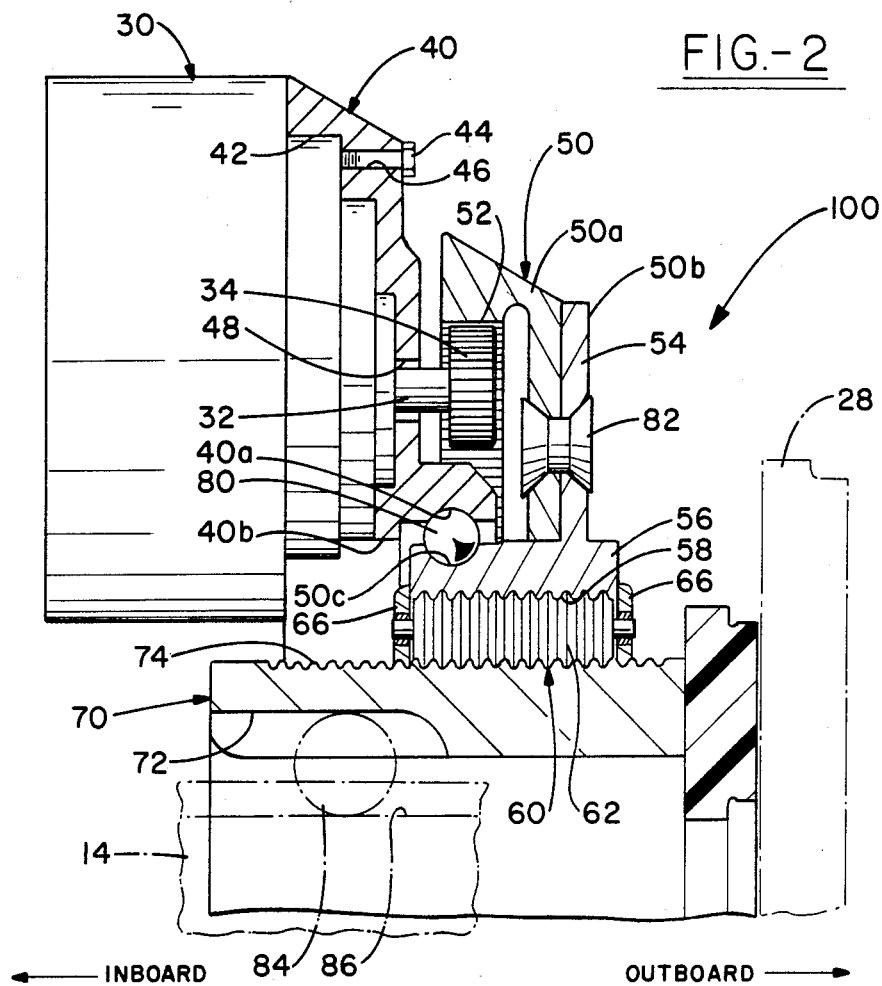
FIG. 2 is a greatly enlarged showing of the reciprocating control means shown in FIG. 1.
Figure 4:
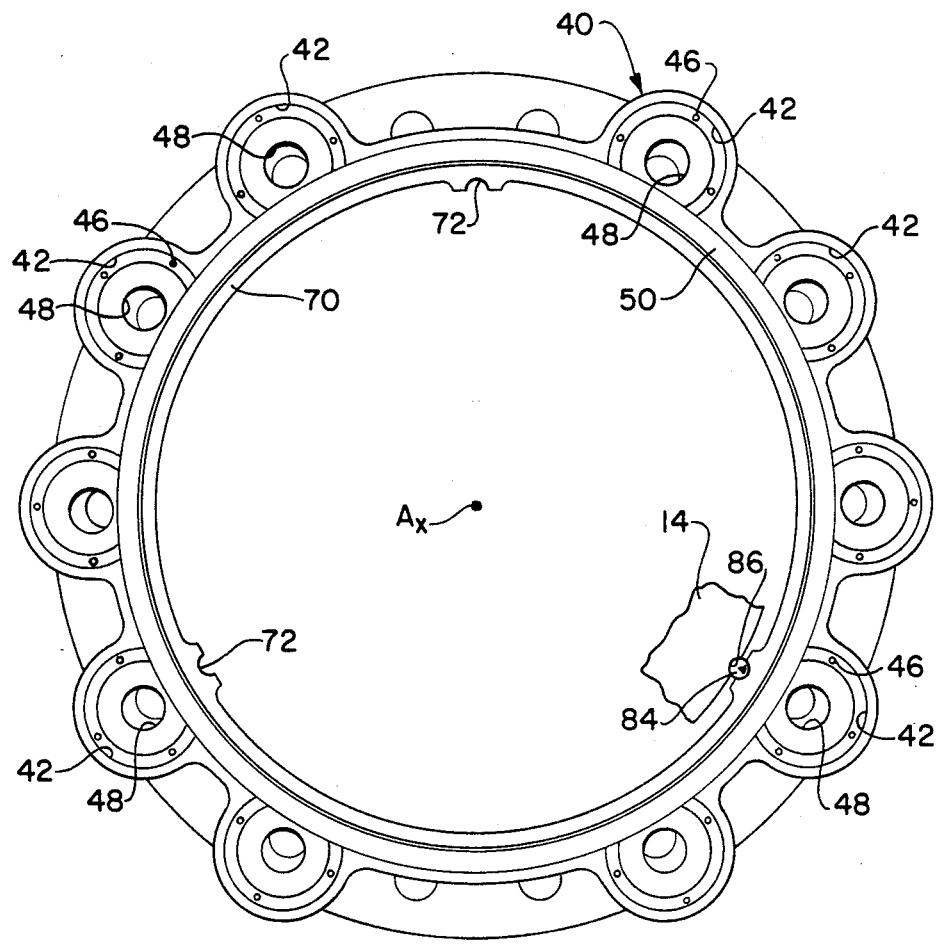
FIG. 4 is an elevational view, partially broken away and as it may be taken from the inboard toward the outboard direction along the Ax axis, showing a representative configuration comprising a plurality of torque motor positions to effect the requisite motion of the reciprocating control means for braking action.

More particularly and referring now to FIG. 2 of the drawings, a torque motor 30 is mounted in a relatively stationary housing member 40 by being received within a cavity 42 and fixedly secured thereto by a plurality of fasteners which may be any suitable screw or bolt 44. The fasteners 44 are carried within bores 46 in the housing 40 which also has a bore 48 for receiving the motor drive shaft 32 therethrough. A pinion gear 34 is attached at the outer extent of the drive shaft 32. While FIG. 2 merely shows a single motor 30, the housing member 40 is actually an annular-shaped member which carries a plurality of such motors. FIG. 4 clearly illustrates a configuration of a particular one such housing wherein ten motor mounting positions 42 are indicated. The actual number of motors 30 to be mounted in a housing 40 will, of course, depend upon the particular brake application and the requirements imposed on the brake assembly. For example, a housing 40 of the type indicated may be configured to mount as many as 15 or as few as two torque motors 30 and these will be positioned in a balanced arrangement within the housing 40 about the $A_x$ axis. Finally, the housing member 40 is characterized by a ball race 40a machined or otherwise formed within an inside surface of its bore 40b. The ball race 40a is one-half of a thrust bearing which carries a plurality of ball bearings 80 and these are mounted within a passageway formed by the race 40a and an opposite race configured in the rotatable ring gear member 50 to be specifically described hereinafter.

The rotatable ring gear member 50 comprises, primarily for ease in manufacture, two annular-shaped pieces 50a and 50b which are positioned inboardly and outboardly respectively about the $A_x$ axis. The inboard portion 50a is functionally a ring gear having gear teeth 52 about an inner bore surface, which teeth are positioned to engage matching teeth of the pinion gear 32 in a conventional manner. The inboard portion 50a is secured to the outboard portion 50b by fasteners 82 and both portions rotate as a single integral unit by the action of the pinion 34 on the ring gear teeth 52. The outboard portion 50b is an L-shape in cross-section having a vertical leg 54 that attaches to the inboard piece 50a via fasteners 82 and an axial or horizontal leg 56 which carries the other half of the thrust bearing race indicated at 50c. A bore surface in the horizontal leg 56 is characterized by a plurality of annular ridges and grooves 58 which function to engage the planetary rollers 60 in a manner to be described hereinafter.

The axially movable ram member 70 is mounted in the brake housing 14 and is restrained from rotational motion about the $A_x$ axis by reason of ball slots 72 which interact with anti-rotational balls 84 mounted in corresponding slots 86 in the brake housing structure 14. The relationship which exists between the slots 72,86 and the balls 84 is clearly illustrated in FIG. 4 of the drawings at three balanced locations within the bore of the ram member 70. Referring again to FIG. 2, the ram member 70 is characterized by a plurality of ridges and grooves 74 in its outwardly facing surface and these have a particular helical pitch which when interacting with the rollers 60 effects an axial movement to the ram member.

Now therefore, and as hereinbefore stated, the rollers 60 are planetary type rollers and these are configured with a grooved drive surface 62. The surface 62 comprises ridges and grooves which are annular rather than helical in configuration and may comprise a machined surface which is complimentary with the ridges and grooves 58 in the bore of the rotatable ring gear member 50. Alternatively, the roller ridges and grooves may be configured from a plurality of stacked washers, alternating ones of the stack having the major diameter of the roller which establishes the ridge height while the other alternating ones have a minor diameter which establishes the groove depth. In either of these above-mentioned configurations, each roller 60 is mounted between a pair of keeper plates 66 which are affixed to an inboard and to an outboard facing surface of the rotatable ring gear member 50.

Figure 3:
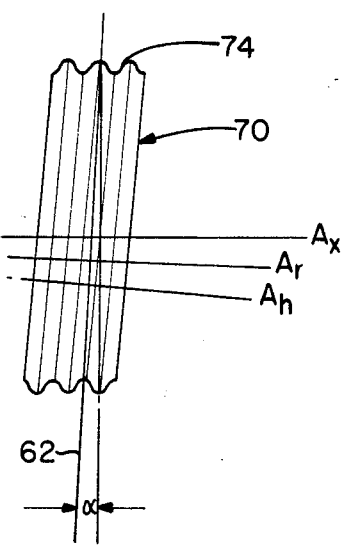
FIG. 3 diagrammatically illustrates an angular axial relationship which exists between various elements forming a first embodiment planetary roller screw drive mechanism for this invention.

Referring now to FIG. 3 of the drawings, each roller 60 is mounted between the keeper plates 66 such that its axis indicated at $A_r$ is offset with respect to the $A_x$ axis about which both the ring gear member 50 and the ram member 70 are axially mounted. Accordingly, a line drawn parallel to the roller ridges and grooves 62 and which is perpendicular to the roller axis $A_r$ defines an angle $\alpha$ with respect to both the rotatable ring gear member ridges and grooves 58 as illustrated in the left hand portion of FIG. 3 and to the ram member ridges and grooves 74 as illustrated in the right hand portion of the figure. Preferably, the angle $\alpha$ is one-half the pitch angle of the helically turned ridges and grooves of the ram member 70 which are also perpendicular to an axis indicated at $A_h$ which is the axis of the helix with respect to the $A_x$ axis of the ram member 70. It will be appreciated therefore that a rotation of the ring gear member 50 effects rotation of the rollers 60 and these in turn advance the ram member 70 in the axial direction dependent upon the direction of rotation of the ring gear member. Furthermore, because the ridges and grooves 58 in the bore of the ring gear member 50 are annular and the ridges and grooves 62 about the surface of each roller 60 are also annular, there is no axial motion imparted relatively between these two members. However, because the ridges and grooves 74 in the surface of the ram member 70 are helical turns, the interaction of these with the rollers 60 effects a relative axial motion between these two members. The rollers 60 are, or course, stationary in the axial direction by reason of their mounting within the bore of the ring gear member 50 and therefore the axial motion is imparted to the ram member 70. It will be further appreciated from the foregoing that the rollers 60 travel in a planetary path and do not move axially when the rotatable member 50 is rotated by the pinion 34 and consequently they do not have to be recirculated.

Figure 5:
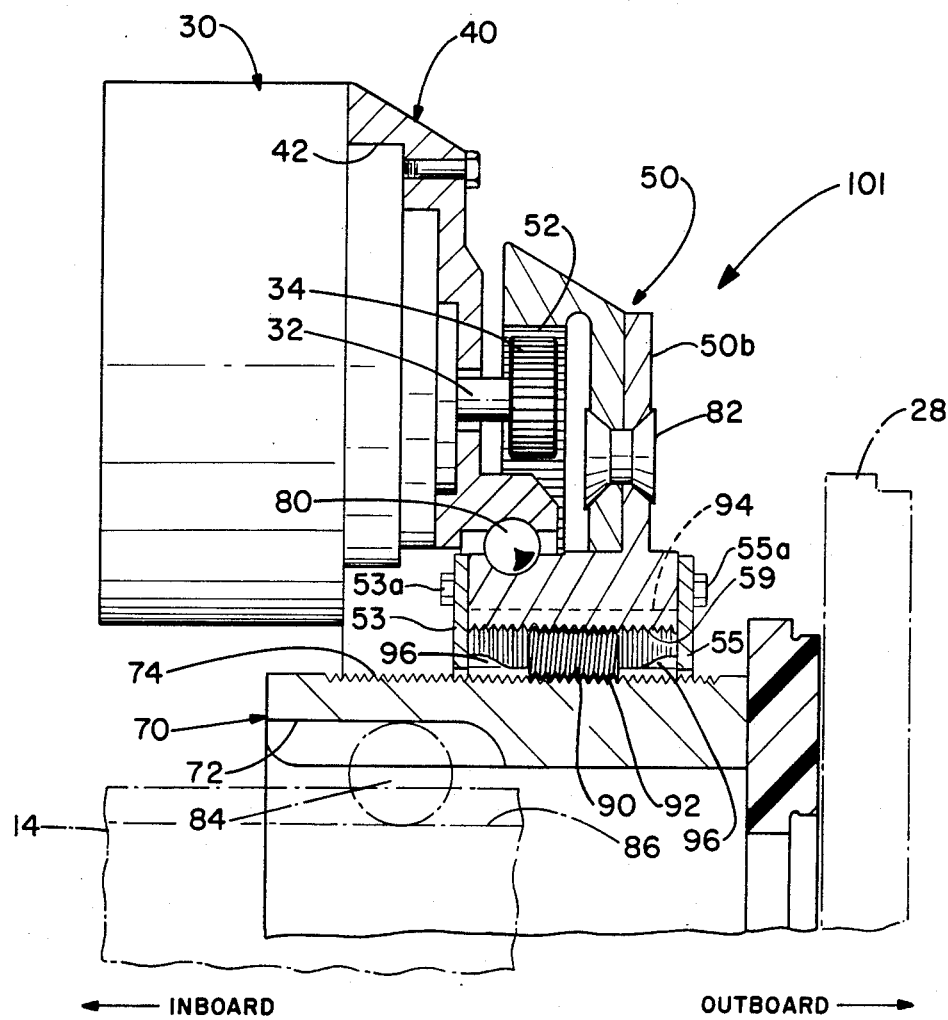
FIG. 5 is an elevational view similar to FIG. 2 and in partial cross-section showing a second embodiment of the invention which forms a recirculating roller screw drive for brake actuation.

FIG. 5 of the drawings illustrates a second embodiment of the invention which is generally indicated by reference numeral 101. According to this embodiment, a plurality of rollers 90 are mounted between the ring gear member 50 and the ram member 70, which rollers 90 are characterized by a ridge and groove outwardly facing surface 92 having a continuous helical turn of the same pitch as the ridges and grooves 74 of the ram member 70. In addition, the ring gear member 50 is characterized by a bore surface comprised of matching ridges and grooves generally indicated at 59 and these are helically pitched with respect to the $A_x$ axis. In this configuration, a rotation of the ring gear member 50 as effected by the pinion gear 34 will move each roller 90 in the axial direction within the confines of the ring gear bore 59. The rotation and axial movement of the rollers 90 effects an axial movement of the ram member 70 into and out of contacting engagement with the brake pressure plate indicated at 28 in a ghost-line illustration. It will be appreciated that, because the roller ridges and grooves 92 are helical turns and the rollers move axially, they must be recirculated back to a starting position when the ring gear member rotates beyond a particular portion of the helical turn extent of its ridges and grooves. In this respect, each roller 90 has an axial length which is a particular portion of the axial length of the bore 59 and the actual length is dependent upon the helical pitch of its ridges and grooves and that of the interacting members. In any event, and to limit the axial excursion of each roller 90, an end ring 53 is provided at the inboard end of the ring gear member 50 and it is affixed via fasteners 53a while an end ring 55 is provided at the outboard end and it is affixed via fasteners 55a. Recirculation of each roller 90 may be accomplished, for example, by a cam and slot configuration wherein a slot (indicated at 94) is machined axially within the bore of the ring gear member 50 and in-line cams 96 are provided which lift the roller radially out of contacting engagement with ram member 70 and into the slot 94. Upon continued rotation of the ring gear member 50 in the same direction, a roller 90 is moved back to its starting position within the bore of the ring gear member. It is anticipated that a roller 90 need only be moved back a single ridge and groove distance of the ram member ridges and grooves 74 at any point of recirculation. A recirculating roller screw mechanism which operates on the principle just described is produced by SKF Group of La Technique Integrale of Chambery, France and sold under the Trademark "TRANSROL".

What is claimed is:

1. A reciprocating drive for operative axial communication with a brake disk stack through a pressure plate to compress the disk stack for braking of a rotatable wheel comprising in combination:

a relatively stationary annular-shaped housing having an axial bore;

an annular-shaped ram member mounted coaxially within the housing bore and adapted for axial movement and contacting engagement with the pressure plate;

an annular-shaped ring gear member mounted coaxially within the housing bore, between the housing and the ram member and adapted for rotational movement relative to the axially moving ram member;

a plurality of rollers operatively positioned between and engaging the ring gear and ram members to effect axial movement of the ram member upon being rotated by the ring gear member; and at least two high torque motors mounted within the housing in a balanced arrangement and each said motor having associated pinion drive means for operative engagement with the ring gear member to effect rotation of the ring gear member in response to an electrical input signal.

2. The reciprocating drive as set forth in claim 1 wherein the rotatable ring gear member, plurality of rollers, and axial moving ram member comprise a planetary roller drive.

3. The reciprocating drive as set forth in claim 2 wherein the rotatable ring gear member has a bore surface comprised of annular ridges and grooves, the ram member has an outer surface comprised of a continuous ridge and groove helical turn, and the rollers have annular ridges and grooves which interact with the ridges and grooves of both ring gear and ram members.

4. The reciprocating drive as set forth in claim 3 wherein each roller has an axis which is offset with respect to the axes of the ring gear and ram members such that there is at least a half pitch difference between the roller ridges and grooves and the ridges and grooves of both ring gear and ram members.

5. The reciprocating drive as set forth in claim 4 wherein the plurality of rollers are mounted between plates affixed to either side of the rotatable ring gear member.

6. The reciprocating drive as set forth in claim 1 wherein the rotatable ring gear member, plurality of rollers, and ram member comprise a recirculating roller drive.

7. The reciprocating drive as set forth in claim 6 wherein the rotatable ring gear member has a bore surface comprised of ridges and grooves in a continuous helical turn, the ram member has an outer surface comprised of ridges and grooves in a continuous helical turn, and each of said rollers has an outer surface comprised of ridges and grooves in a continuous helical turn which interact in complimentary manner with the ridges and grooves of the ring gear and ram members such that upon rotation of the ring gear member the rollers effect an axial movement of the ram member into and out of contacting engagement with the pressure plate.

8. The reciprocating drive as set forth in claim 7 wherein each of said rollers is recirculated back to a starting position when moved axially within the bore of the ring gear member by a cam and slot arrangement, the slot being machined axially within the bore of the ring gear member and the cams being mounted in-line with the slot such that each roller is radially removed from contacting engagement with the ram member by the cams and upon continued rotation of the ring gear member is recirculated back to a starting position.

9. The reciprocating drive as set forth in claim 8 wherein each roller is recirculated back a single helical turn of the ring gear member ridges and grooves.

10. A reciprocating drive for operative axial communication with a brake disk stack through a pressure plate to compress the disk stack for braking of a rotatable wheel comprising in combination:

a relatively stationary coaxially mounted annular-shaped housing having a bore and a ball race formed within the bore;

an annular-shaped ram member mounted coaxially within the bore of the housing and adapted for axial linear movement through the bore to effect contacting engagement with the pressure plate, said ram member having a continuous helical ridge and groove configuration of a particular pitch with respect to its axis formed about an outwardly facing surface;

a relatively rotatable annular-shaped member mounted coaxially between the housing and the ram member, said rotatable member having a portion disposed within the bore of the housing and having a ball race formed within an outwardly facing surface in relative position to the ball race formed in the housing bore, the two ball races and a plurality of ball bearings carried between them forming a thrust bearing as between the two members, said rotatable member further characterized by a plurality of annular ridges and grooves formed within its bore and a plurality of ring gear teeth formed within an annular peripheral edge surface which extends exteriorly of the housing bore;

a plurality of rollers operatively positioned between the relatively rotatable member and the axially movable ram member, each said roller having a plurality of annular ridges and grooves formed within an outwardly facing surface for inter-engagement with the annular ridges and grooves formed within the bore of the rotatable member and for inter-engagement with the helically formed ridges and grooves of the ram member, the axis of rotation of each said roller being angularly disposed with respect to the axes of the relatively rotatable and ram members such that a rotation of the rotatable member effects rotation of the individual rollers which in turn effect a linear and axial movement of the ram member into and out of contacting engagement with the pressure plate; and at least two high torque motors mounted in a balanced relationship within the housing, each motor having a pinion drive means operatively engaged with the ring gear teeth of the rotatable member to effect rotation of said member in response to an electrical input signal.

11. The reciprocating drive as set forth in claim 10 wherein the rollers are mounted between keeper plates affixed to an inboard surface and to an outboard surface of the relatively rotatable member, which rollers rotate in a planetary path within the confines of the keeper plates.

12. The reciprocating drive as set forth in claim 11 wherein the angular relationship of each roller ridge and groove is one-half the pitch angle of the helical ridges and grooves formed about the surface of the ram member.

13. A reciprocating drive for operative axial communication with a brake disk stack through a pressure plate to compress the disk stack for braking of a rotatable wheel comprising in combination:

a relatively stationary coaxially mounted annular-shaped housing having a bore and a ball race formed within the bore;

an annular-shaped ram member mounted coaxially within the bore of the housing and adapted for axial linear movement through the bore to effect contacting engagement with the pressure plate, said ram member having a continuous helical ridge and groove configuration of a particular pitch with respect to its axis formed about an outwardly facing surface;

a relatively rotatable annular-shaped member coaxially mounted between the housing and ram member, said rotatable member having a portion disposed within the bore of the housing and having a ball race formed within an outwardly facing surface in relative position to the ball race formed in the housing bore, the two ball races and a plurality of ball bearings carried between them forming a thrust bearing as between the two members, said rotatable member further characterized by a continuous helical ridge and groove surface formed within its bore and a plurality of ring gear teeth formed within an annular peripheral edge surface which extends exteriorly of the housing bore;

a plurality of rollers operatively positioned between the rotatable and ram members, each said roller characterized by helically pitched ridges and grooves which complimentarily interact with the ridges and grooves of both the rotatable and ram members such that a rotation of the rotatable member effects a rotation of the rollers and these effect an axial movement of the ram member; and at least two high torque motors mounted in a balanced relationship within the housing, each motor having a pinion drive means operatively engaged with the ring gear teeth of the rotatable member to effect rotation of said member in response to an electrical input signal.

14. The reciprocating drive as set forth in claim 13 wherein each of said rollers is maintained in an axial alignment with said rotatable and ram members by means positioned between successive rollers and each of said rollers is recirculated back to a starting position when moved axially within the bore of the rotatable member by a cam and slot configuration, the slot being machined axially within the bore of the rotatable member and the cams being mounted in-line with the slot such that each successive roller is removed radially from contacting engagement with the ram member by the cams and upon continued rotation of the rotatable member such roller is recirculated back to a starting position.

15. The reciprocating drive as set forth in claim 14 wherein the plurality of rollers are maintained within the bore of the ring gear member by keeper plates affixed to either side of the ring gear member.

* * * * *